United States Patent
Hao et al.

(10) Patent No.: US 9,355,357 B2
(45) Date of Patent: May 31, 2016

(54) COMPUTING PREDICTED DATA ACCORDING TO WEIGHTED PEAK PRESERVATION AND TIME DISTANCE BIASING

(75) Inventors: Ming C. Hao, Palo Alto, CA (US); Umeshwar Dayal, Saratoga, CA (US); Daniel Keim, Arcisslingen (DE); Walter Hill, Mettmann (DE); Sabastian Mittelstädt, Constance (DE); Halldór Janetzko, Constance (DE)

(73) Assignee: Hewlett Packard Enterprise Development LP, Houston, TX (US)

(*) Notice: Subject to any disclaimer, the term of this patent is extended or adjusted under 35 U.S.C. 154(b) by 1105 days.

(21) Appl. No.: 13/278,572

(22) Filed: Oct. 21, 2011

(65) Prior Publication Data
US 2013/0103616 A1   Apr. 25, 2013

(51) Int. Cl.
| G06F 17/00 | (2006.01) |
| G06F 17/20 | (2006.01) |
| G06N 5/04 | (2006.01) |
| G09B 7/04 | (2006.01) |
| G06F 11/30 | (2006.01) |
| G06Q 10/04 | (2012.01) |

(52) U.S. Cl.
CPC .............. *G06N 5/04* (2013.01); *G06F 11/3062* (2013.01); *G06F 11/3072* (2013.01); *G06Q 10/04* (2013.01); *G09B 7/04* (2013.01)

(58) Field of Classification Search
None
See application file for complete search history.

(56) References Cited

U.S. PATENT DOCUMENTS

| 6,928,398 B1 | 8/2005 | Fang |
| 7,406,435 B2 | 7/2008 | Aronowich |
| 7,421,380 B2 | 9/2008 | Thiesson |
| 2002/0184134 A1 | 12/2002 | Olsen et al. |
| 2005/0090911 A1* | 4/2005 | Ingargiola et al. .............. 700/36 |
| 2008/0033991 A1 | 2/2008 | Basak |
| 2008/0170073 A1 | 7/2008 | Ono |
| 2008/0319951 A1 | 12/2008 | Ueno |
| 2011/0279469 A1* | 11/2011 | Hao et al. ...................... 345/582 |
| 2012/0102396 A1* | 4/2012 | Arksey et al. ................. 715/273 |

FOREIGN PATENT DOCUMENTS

JP   2005259090   9/2005

OTHER PUBLICATIONS

Aigner et al., Visualizing Time-Oriented Data—A Systematic View, Mar. 2007 (17 pages).
Buono et al., Interactive Pattern Search in Time Series, 2005 (11 pages).

(Continued)

*Primary Examiner* — Kakali Chaki
*Assistant Examiner* — Luis Sitiriche
(74) *Attorney, Agent, or Firm* — Trop, Pruner & Hu, P.C.

(57) ABSTRACT

A value corresponding to an adjustable control element is received. Predicted data is computed from seasonal data, where the computing is according to applying preservation of peaks in the seasonal data and applying time distance biasing in which more recent data points in the seasonal data are weighted higher than less recent data points. Relative weighting of the peak preservation and the time distance biasing is based on the received value corresponding to the adjustable control element.

22 Claims, 5 Drawing Sheets
(2 of 5 Drawing Sheet(s) Filed in Color)

(56) References Cited

OTHER PUBLICATIONS

Broberg et al., Visualization and Performance Prediction of Multithreaded Solaris Programs by Tracing Kernel Threads, IEEE 2006 (7 pages).
Bash et al., Dynamic Thermal Management of Air Cooled Data Centers, IEEE 2006 (8 pages).
Croker et al., Presentation Quality Forecast Visualization with SAS/GRAPH, NESUG 2007 (11 pages).
Hao et al., Multi-Resolution Techniques for Visual Exploration of Large Time-Series Data, IEEE 2007 (8 pages).
Ichikawa et al., A Visualization Environment for Multiple Daytime Stock Price Predictions, Sep. 2002 (7 pages).
R.E. Kalman, A New Approach to Linear Filtering and Prediction Problems, ASME 1960 (12 pages).
Patnaik et al., Sustainable Operation and Management of Data Center Chillers using Temporal Data Mining, ACM 2009 (9 pages).
www.arnetminer.org, Abstract: On building next generation data centers: energy flow in the information technology stack, 2008 (3 pages).
Sadek, et al., ATM Dynamic Bandwidth Allocation Using F-ARIMA Prediction Model, 2003 (5 pages).
James W. Taylor, Forecasting Daily Supermarket Sales Using Exponentially Weighted Quantile Regression, European Journal of Operational Research, 2007, vol. 178 (31 pages).
Hao et al., A Visual Analytics Approach for Peak-Preserving Prediction of Large Seasonal Time Series, IEEE 2011 (10 pages).
Peter R. Winters, Abstract—Management Science: Forecasting Sales by Exponentially Weighted Moving Averages, Apr. 1960 (2 pages).
Hao et al., U.S. Appl. No. 12/800,526, filed May 17, 2010 entitled Performing time slice-based visual prediction (40 pages).

* cited by examiner

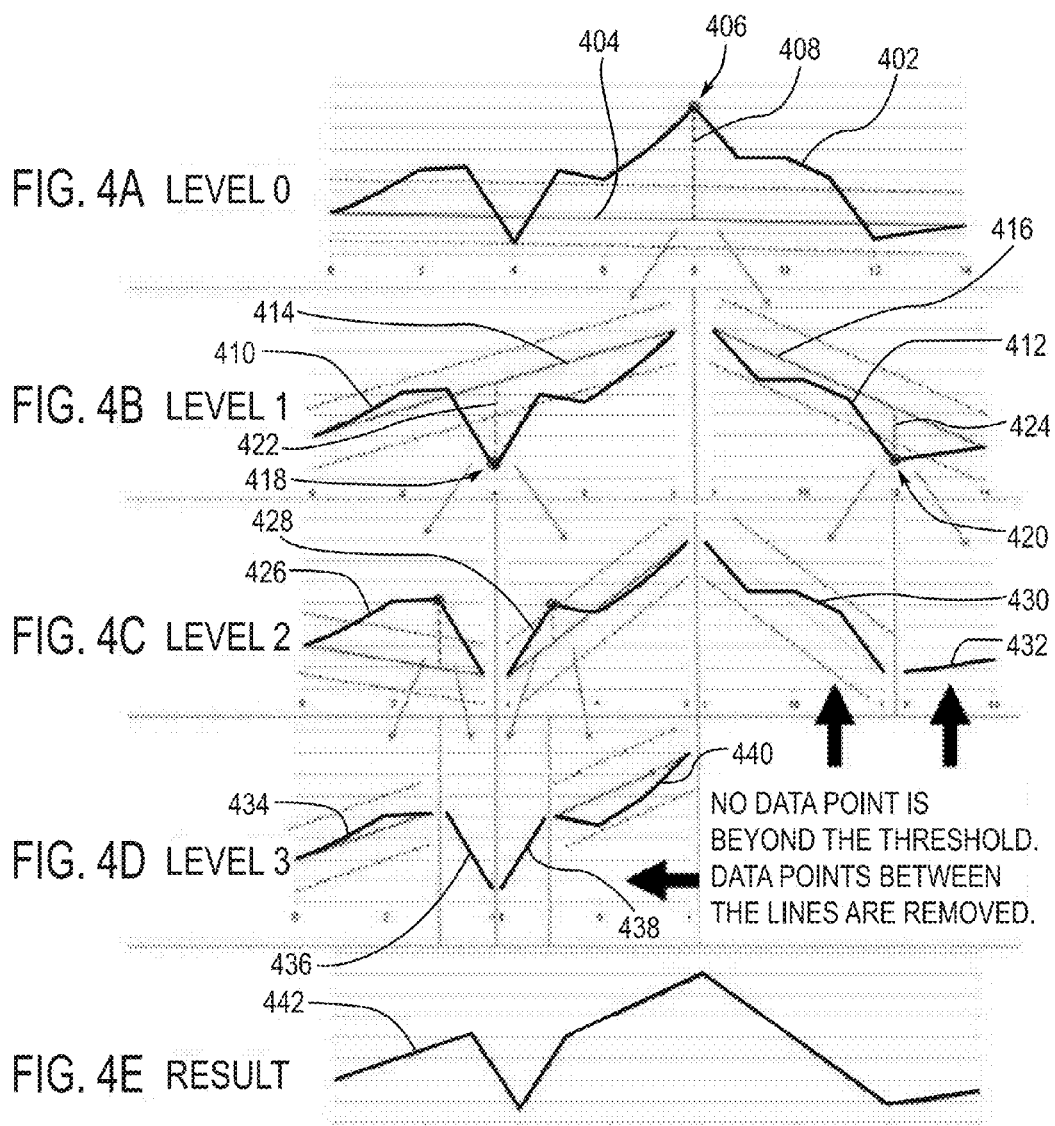

COMPUTING PREDICTED DATA ACCORDING TO WEIGHTED PEAK PRESERVATION AND TIME DISTANCE BIASING

BACKGROUND

Data values associated with various aspects of a system (such as a network including network nodes, software components, and database components) can be collected over time. For example, sensors or monitors can be provided in a network to collect measurements of various parts of the network. Alternatively, data can be collected regarding various other operational aspects of an organization, such as data relating to sales operations, human resource operations, and so forth. The amount of data collected can be relatively large, making understanding and analysis of the collected data relatively difficult.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures:

FIGS. 4A-4E are graphs illustrating an example procedure for performing peak preservation, according to some implementations.

DETAILED DESCRIPTION

Figure 1:
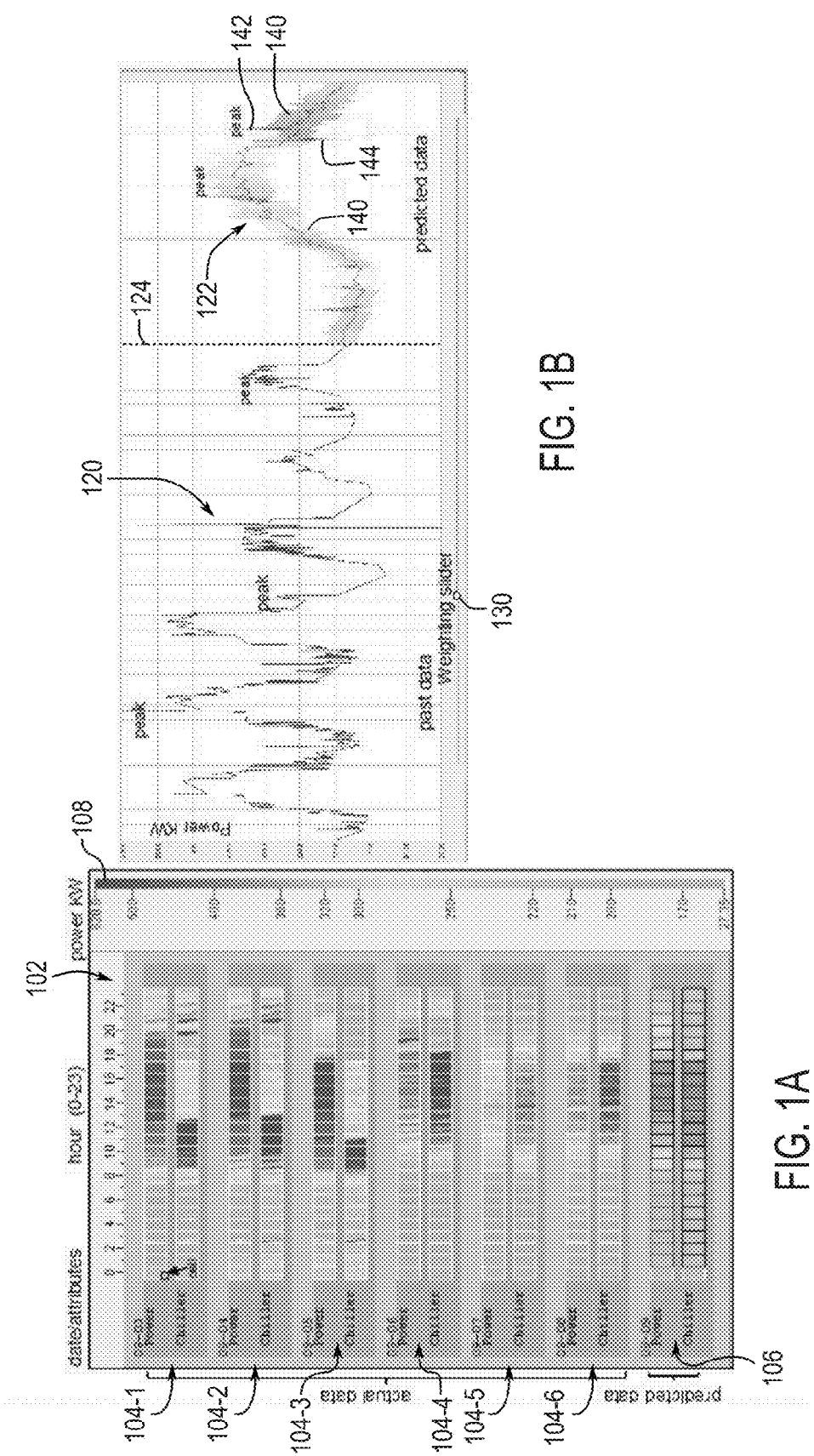
FIG. 1A illustrates a cell-based visualization of actual time series and a predicted time series, produced according to some implementations.
FIG. 1B is a graph that includes actual data and predicted data produced according to some implementations.

In an organization (such as a company, an educational organization, a government agency, a department or division of any of the foregoing, or another type of organization), data can be collected regarding various aspects of the organization. Examples of collected data include measurements taken by network monitors or sensors (e.g. measurements relating to processor utilization, storage system utilization, network utilization, system component temperature, power usage, chiller operations, etc.), data relating to sales activity, revenue data, and/or other types of data.

Some examples of analysis that may be performed on the collected data can include predictions of data values based on preexisting (historical) data values to find patterns, trends, or other characteristics in data. For example, an organization may wish to predict power consumption of a system in a future time period based on historical power consumption data. Alternatively, a supply chain company may wish to predict the number of products that should be stored at various sites for a next time period based on historical sales data.

More generally, historical data can be analyzed for predicting the likelihood of future events based on the historical data.

In some implementations, the historical data that is to be analyzed includes seasonal data, where "seasonal data" refers to data that exhibits at least one repeating pattern over time. For example, seasonal data including measurements of power consumption of a computer system may indicate that relatively high power consumption exists during work hours while relatively low power consumption exists during non-work hours. Such seasonal data exhibits a daily repeating pattern (a pattern that repeats every 24 hours). In other examples, seasonal data can exhibit patterns repeating over other time intervals, such as hours, weeks, months, years, and so forth.

In accordance with some implementations, data prediction mechanisms or techniques are provided for generating predicted data based on historical seasonal data, where the prediction is based on use of weighted peak-preserving and time distance biasing mechanisms or techniques. Peak preservation refers to preservation of peaks in the seasonal data when computing predicted data. A "peak" in the seasonal data can refer to a data point (or collection of data points) that is at a highest or lowest level when compared to nearby data points (e.g. data points within a time range or other range of the data point(s) that is at the highest or lowest level). Preserving peaks in the seasonal data avoids or reduces the likelihood of removing peaks in the seasonal data when performing data prediction, which may occur when attempting to remove noise from the seasonal data prior to performing the data prediction.

In various applications, peaks in seasonal data can provide relatively useful information. For example, a data center (that includes a distributed arrangement of computing systems and/or other types of systems) may wish to use the data center's resources as efficiently as possible. Taking into account peaks in the seasonal data allows for more accurate prediction of future peaks that may occur, which can allow the data center to more efficiently plan for such predicted peaks. In this way, the risk of exceeding capacities (e.g. power or cooling capacities) in the data center can be reduced.

Time distance biasing refers to placing more importance on more recent data points in the historical data as compared to less recent data points. Stated differently, time distance biasing involves applying greater weight to more recent data points in the historical data and applying lower weight to less recent data points in the historical data.

The goals of peak preservation and time distance biasing may be inconsistent with each other. While time distance biasing tends to place greater importance on more recent data, it is noted that there can be peaks in historical data that occur less recently (peak preservation may attempt to place greater importance on such peaks that are farther out in time). In accordance with some implementations, mechanisms or techniques are provided to allow for weighting the goals of peak preservation versus time distance biasing. In some implementations, an adjustable control element can be provided that can be adjusted to place greater or less weight on peak preservation versus time distance biasing. The adjustable control element can be adjusted by a user (e.g. an administrator) or alternatively the adjustable control element can be adjusted by an automated entity, such as an application or other entity.

In some examples, the adjustable control element can be presented in a graphical user interface (GUI), such as in the form of a movable control icon (e.g. a slider) that is movable in response to user input. Moving the control icon in a first direction would cause greater weight to be placed on peak preservation and less weight to be placed on time distance biasing, while moving the control icon in a second, opposite direction would cause less weight to be placed on peak preservation and greater weight to be placed on time distance biasing. In other implementations, the adjustable control element can include menu control items, text boxes (where a user can enter values for indicating relative weights to be assigned to peak preservation versus time distance biasing), and so forth.

FIG. 1A shows an example cell-based visualization for visualizing multiple actual time series and a predicted time series. An "actual" time series can refer to a sequence of collected data points over time. A "predicted" time series can refer to a sequence of predicted data points over time. A cell-based visualization includes multiple cells, where each cell represents a corresponding data point (or group of data points), and each cell has a visual indicator (e.g., color, shading, shape, etc.) that varies according to the corresponding value of an attribute of the data point (or group of data points).

The cell-based visualization 102 multiple rows 104-1, 104-2, 104-3, 104-4, 104-5, and 104-6 of cells that represent respective different times series, such as time series for different days. Each row 104-1 through 104-6 includes cells representing data points in a 24-hour day. Each row has two sub-rows, where the first sub-row of cells corresponds to power measurements, and the second sub-row of cells corresponds to chiller measurements. Each sub-row has 24 blocks of data, where each block corresponds to a respective hour of the day (or other time interval). Within each block is arranged an array of cells that correspond to respective data points (e.g. individual data points or groups of data points). Each data point may have been collected in a corresponding one-minute interval, for example, or other time interval. In examples according to FIG. 1A, each cell is assigned a color that represents the corresponding value of an attribute ("coloring attribute") of the data point. Different colors represent different attribute values. A color scale 108 on the right side of the cell-based visualization 102 maps different colors to different values of the coloring attribute.

Another row 106 of cells is provided that contains cells representing respective predicted data points. The row 106 also includes two sub-rows, including a first sub-row of cells corresponding to power measurements, and a second sub-row of cells corresponding to chiller measurements. Each sub-row has multiple blocks, where each block corresponds to one hour (or other time interval). A block contains an array of cells that represent respective predicted data points. The predicted data represented by the row 106 is based on the historical data represented by rows 104-1 through 104-6.

FIG. 1B illustrates a line graph that has two portions 120 and 122 (as divided by a dividing line 124). The line graph portion 120 represents data points in historical or past data (e.g. subset or entirety of data points in time series 104-1 to 104-6), while the line graph portion 122 represents predicted data points (e.g. the data points in the time series 106). As can be seen in the line graph portion 120, various peaks are present in the historical data. By applying the peak preservation according to some implementations, the predicted data that is produced can take into account the peaks in the historical data. The predicted data also includes various peaks, as shown in the line portion 122.

FIG. 1B also shows a weighting slider 130 that is movable in a left direction or a right direction. The weighting slider 130 is an example of an adjustable control element as discussed above to allow for adjustment of relative weighting of peak preservation versus time distance biasing. In examples according to FIG. 1B, moving the weighting slider 130 to the left places greater weight on peak preservation and less weight on time distance biasing, while moving the weighting slider 130 to the right places greater weight on time distance biasing and less weight on peak preservation.

FIG. 1B also shows a certainty band 140, which is represented by a grey area surrounding the line graph portion 122. The width of the certainty band 140 around a particular data point or group of data points shows the range in which values of the data point are to be expected. Generally, the certainty band around the predicted data points indicate degrees of certainty associated with the corresponding predicted data points. A relatively narrow certainty band 140 indicates that the predicted data point(s) will match the actual data point with higher probability. On the other hand, a wider certainty band 140 indicates that the predicted data point(s) will match the actual data point with lower probability. The width of the certainty band 140 around a particular data point can be calculated by using standard deviation of the historical data. If values of the historical data at the corresponding time points differ significantly, then a wider certainty band 140 would be provided. On the other hand, if the values of the corresponding time points in the past are closer to each other, then a narrower certainty band 140 can be provided. The lower and upper bounds of values of a corresponding data point, as represented by the certainty band 140, can be calculated by adding or subtracting half of the standard deviation of past data point values, in some examples.

The certainty band 140 also can have varying gray levels (varying saturation) to indicate which data points are more interesting (more important) than other data points. For example, the certainty band 140 around the relatively sharp peaks 142 and 144 in the line graph portion 122 can be made darker (more saturated) to highlight the higher relative importance of these more pronounced peaks 142 and 144.

Referring again to FIG. 1A, as noted above, the row 106 of cells representing predicted data points includes two sub-rows of blocks, where each block contains an arrangement of cells. Some of the blocks are more lightly shaded, while other blocks are more heavily shaded. The heavier shading corresponds to predicted data points associated with a narrower certainty band, while the lighter shading corresponds to predicted data points associated with a wider certainty band.

Figure 2:
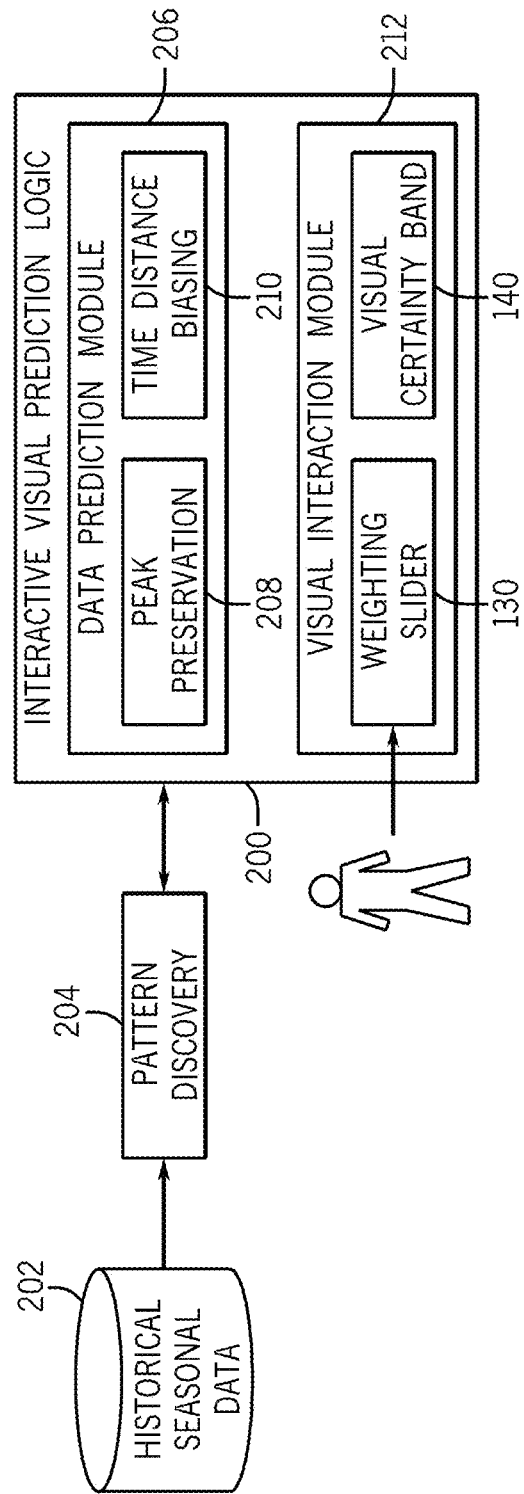
FIG. 2 is a block diagram of an example arrangement that incorporates some implementations.

FIG. 2 is a block diagram of an arrangement according to some implementations. Historical seasonal data 202 is processed for visualization, such as in the cell-based visualization 102 of FIG. 1A or in another visualization. Providing a visualization of historical seasonal data allows for pattern discovery (204), such as discovery by a user or an automated entity. Pattern discovery allows for a selection of a portion of the historical seasonal data that contains a pattern of interest that should be further analyzed to predict future data points. In other examples, the entirety of the historical data 202 can be processed for performing data prediction.

FIG. 2 also shows an interactive visual prediction logic 200 that is able to perform data prediction based on application of weighted peak preservation and time distance biasing. The interactive visual prediction logic 200 includes a data prediction module 206 that performs the data prediction. The data prediction module 206 applies peak preservation 208 and time distance biasing 210. In accordance with some implementations, relative weighting between the peak preservation 208 and the time distance biasing 210 is controlled based on adjustment of the weighting slider 130, which is part of a visual interaction module 212. The visual interaction module 212 is able to present a visual output (such as in the form of FIGS. 1A and 1B), and to receive input, such as from a user. One example of such user input is adjustment of the weighting slider 130. The visual interaction module 212 also is able to present the visual certainty band 140 that is shown in FIG. 1B.

Figure 3:
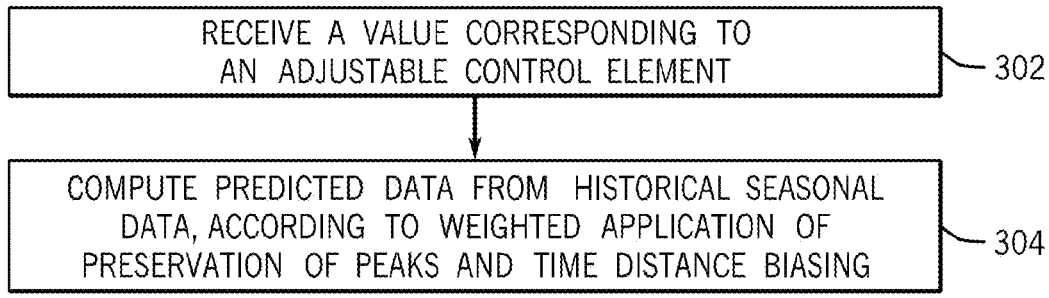
FIGS. 3 and 5 are flow diagrams of processes according to some implementations.

FIG. 3 is a flow diagram of a process according to some implementations. The process of FIG. 3 can be performed by the interactive visual prediction logic 200 of FIG. 2, for example. The process receives (at 302) a value corresponding to an adjustable control element, such as the weighting slider 130. The value of the adjustable control element can vary according to different positions of the adjustable control element. The process next computes (at 304) predicted data from seasonal data (e.g. 202 in FIG. 2), where the computing is according to applying preservation of peaks in seasonal data and applying time distance biasing, where relative weighting of the peak preservation and the time distance biasing is based on the received value corresponding to the adjustable control element.

When predicting data for a particular time interval, such as for a particular minute, a particular hour, a particular day, and so forth, each time point in the historical data corresponding to the particular time point is considered. For example, in historical data exhibiting a weekly pattern, predicted data can be generated for each day of the week (Sunday through Saturday). To compute a predicted data point for Monday, past Monday data points in the historical seasonal data are considered for producing the predicted data point for Monday. Computing predicted data points for other days of the week are similarly based on past data points in corresponding days of the week.

With data exhibiting other seasonal patterns, predicted data can be produced for other data points. In the ensuing discussion, it is assumed that predicted data is produced for each minute of a day. A formula for predicting data for a particular minute of the day (min Of Day) is set forth below:

$$\text{pred}(\text{min Of Day}) = \Sigma_j \text{combinedWeights} \cdot v_j, \quad \text{(Eq. 1)}$$

where $v_j$ represents past data points at the corresponding minute of the day in the historical data, and where combinedWeights is computed as follows:

$$\text{combinedWeights}(w_1, w_2, \alpha) = w_1 \alpha + w_2 \cdot (1-\alpha). \quad \text{(Eq. 2)}$$

In Eq. 2, $w_1$ represents a coefficient corresponding to peak preservation, while $w_2$ represents a coefficient corresponding to time distance biasing. In Eq. 2, $w_1 \cdot \alpha$ represents the weight to apply to peak preservation, while $w_2 \cdot (1-\alpha)$ represents the weight to apply to time distance biasing. The value of $\alpha$ is based on the position of the weighting slider 130 of FIG. 1B or 2, or based another type of adjustable control element. The values of $w_1$ and $w_2$ are discussed further below.

The parameter combined Weights thus represents a combination of the weights for peak preservation and time distance biasing—according to Eq. 1 above, a predicted data is based on a summation (or alternatively some other aggregation) of corresponding historical data points as weighted by combined Weights.

An example pseudocode for computing the predicted data points is provided below:

```
1    double[ ] doPrediction(double[ ] pastValues,
2                    Date[ ] dateOfPastValues,
3                    double[ ] importancePeakWeights) {
4       // create temporary storage:
5       double valueForEachMinuteOfTheDay[ ]
6          = new double[60 * 24];
7       int counterForEachMinuteOfTheDay[ ] = new int[60 * 24];
8
9       double c = calculateConstant(numberOfDays);
10      for (int i = 0; i < pastValues.length; i++) {
11         Date d = dateColumn[i];
12         int minuteOfTheDay = d.getHours( ) * 60 + d.getMinutes( );
13         counterForEachMinuteOfTheDay [minuteOfTheDay]++;
```

-continued

```
14         // Add the current value multiplied with a computed weight to
15         // the right slot, as we are calculating a weighted average
16         valueForEachMinuteOfTheDay[minuteOfTheDay] +=
17            values[i] * combinedWeights(
18               counterForEachMinuteOfTheDay [minuteOfTheDay] * c,
19               importancePeakWeights[i], userSetValue);
20      }
21
22      return valueForEachMinuteOfTheDay;
```

At lines 17-19 of the pseudocode above, the function combinedWeights( ) is computed according to Eq. 2, where $w_1$ of Eq. 2 is equal to counterForEachMinuteOfTheDay[minuteOfTheDay]*c, and $w_2$ is equal to importancePeakWeights[i]. The parameter importancePeakWeights[i] (for data point i) is determined based on looking at the data point and deciding whether the data point is a high peak, a low peak, a medium peak, and so forth. Further details regarding computation of importancePeakWeights[i] are provided below.

Also, $\alpha$ in Eq. 2 is equal to userSetValue at line 19 of the pseudocode. The function doPrediction[ ] at lines 1-3 of the pseudocode is a function that is called to perform data prediction according to some implementations. The array pastValues contains historical data points, the array dateOfPastValues represents time intervals associated with the historical data points, and the array importancePeakWeights contains weight coefficients for preservation of peaks.

Lines 4-7 of the pseudocode create temporary storage for the array valueForEachMinuteOfTheDay, which contains the predicted data points, and for counterForEach MinuteOfTheDay.

At line 9, the function calculateConstant( ) is used to calculate a constant c, as follows:

$$\Rightarrow c = \frac{2}{n*(n+1)}. \quad \text{(Eq. 3)}$$

In Eq. 3, n represents the number of days, and corresponds to numberOfDays at line 9 of the pseudocode above. In Eq. 3, n is number of weights that are to be calculated.

Line 10 iteratively performs the procedure of the pseudocode for the number of data points in the seasonal data, as represented by pastValues.length. Lines 11-12 set the value of the parameter minuteOfTheDay, which is the minute of the day for which the data prediction is to be performed.

Line 13 increments the value of counterForEachMinuteOfTheDay[minuteOfTheDay], for use in providing the weights for time distance biasing. The weights for time distance biasing are linearly decreasing with increasing time distance. Furthermore, the sum of the weights can be set to 1, since techniques according to some examples are using a weighted average. The weights can be set as follows: 1*c, 2*c, 3*c ..., where c is a constant. Eq. 4 below describes the calculation involved in computing the constant c and weights:

$$\sum_{i=1}^{n} i*c = c*\sum_{i=1}^{n} i = c*\frac{n*(n+1)}{2} = 1. \quad \text{(Eq. 4)}$$

Using weights for time distance biasing as computed above, more recent data points are assigned greater weight than older data points.

In some implementations, a variant of a Douglas-Peucker technique is used for peak preservation. Generally, the Douglas-Peucker technique attempts to reduce a graph to its most significant data points. The variant of the Douglas-Peucker technique is discussed in connection with FIGS. 4A-4E. The technique starts with creating a connecting line 404 (FIG. 4A), which connects a first value and last value of data points represented by a graph 402. The technique then identifies for the highest or lowest data point in between the first and last values with respect to the connecting line 404. If the absolute height (e.g. height 408 between a highest data point 406 and the connecting line 404) of the identified data point exceeds a predefined threshold, this identified data point is tagged as a peak. The predefined threshold can vary from application to application. Since users, aided by visual feedback, are more adept at picking a good value for the predefined threshold than automated estimates, users can be allowed to modify the predefined threshold due to movement of the smoothing slider 130 of FIG. 1B or 2.

The technique then divides the graph 402 into two parts (410 and 412) containing the peak value, as shown in FIG. 4B. For each of the two parts 410 and 412 in FIG. 4B, a respective connecting line 414 or 416 connects a corresponding first value and last value of the part. The technique next performs the process recursively again on the two parts 410 and 412 to find peak values (e.g. 418 and 420) in the respective parts 410 and 412. The peak values 418 and 420 have respective heights (422 and 424) to the corresponding connecting lines 414 and 416.

FIG. 4C shows the part 410 broken into two sub-parts 426 and 428, and part 412 broken into two sub-parts 430 and 432. FIG. 4D shows the next recursive application of the technique, which results in further divided parts 434, 436, 438, 440, and so forth. If no more peaks can be found, the process ends. To create a smoothed result, all peak points (including the first and the last value of the original graph 402) are connected, as shown by the graph 442 in FIG. 4E. The resulting graph 442 represents the shape of the original data relatively precisely and without clutter.

The technique discussed above thus recursively partitions a data set according to a highest or lowest peak. The recursion depth of the technique discussed above (represented as "levels" in FIGS. 4A-4D) can be used to estimate the importance of a peak. Then, the recursion depth can be normalized according to a maximum occurring recursion level, and the inverse of the level can be used as a weight—importance-PeakWeights[i] above. To avoid division by zero, a constant number (e.g. 1 or other constant value) can be added to all recursion levels (0 to 3 in FIGS. 4A-4D) before normalization.

Figure 5:
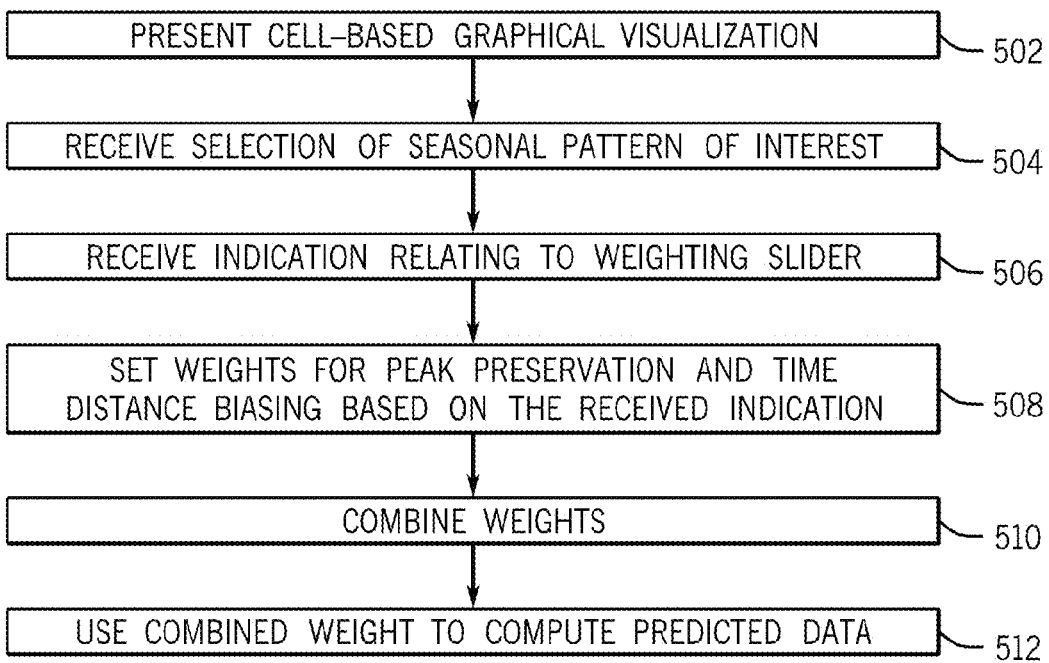

FIG. 5 is a flow diagram of a process according to further implementations. The process of FIG. 5 can also be performed by the interactive visual prediction logic 200 of FIG. 2. The process presents (at 502) a cell-based graphical visualization, such as 102 in FIG. 1A. The process next receives (at 504) a selection of a seasonal pattern of interest, which can be received from a user based on visual inspection of the cell-based visualization.

The process then receives (at 506) an indication relating to a position of the weighting slider 130 of FIG. 1B or 2. The weights for peak preservation and time distance biasing are then set (at 508) based on the received indication, as discussed above.

The weights are then combined (at 510), such as according to Eq. 2 above. The combined weights are then used (at 512) to compute predicted data.

Figure 6:
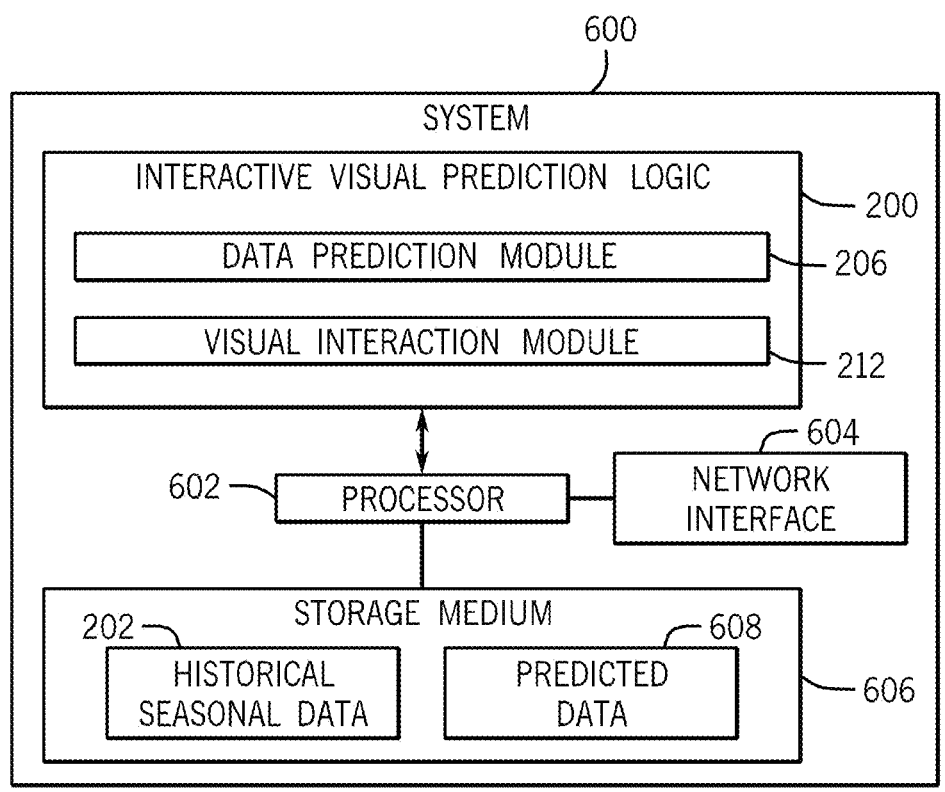
FIG. 6 is a block diagram of an example system incorporating some implementations.

FIG. 6 is a block diagram of an example system 600 that has the interactive visual prediction logic 200 of FIG. 2. The interactive visual prediction logic 200 can perform various tasks discussed above, including those described in connection with FIGS. 3 and/or 5.

The interactive visual prediction logic 200 can be implemented as machine-readable instructions executable on one or multiple processors 602. The processor(s) 602 can be connected to a storage medium (or storage media) 606 and to a network interface 604. A processor can include a microprocessor, microcontroller, processor module or subsystem, programmable integrated circuit, programmable gate array, or another control or computing device. The storage medium 606 can store the historical seasonal data 202, as well as predicted data computed by the interactive visual prediction logic 200.

The storage medium 606 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving seasonal data that exhibits a repeating pattern over time;
receiving, by a system having a processor, a value corresponding to an adjustable control element;
applying, in the seasonal data by the system, preservation of peaks and time distance biasing in which more recent data points in the seasonal data are weighted higher than less recent data points;
calculating, by the system based on the received value corresponding to the adjustable control element, a first weight for the preservation of peaks and a second weight for the time distance biasing;
combining, by the system, the first and second weights to produce a combined weight; and
computing, by the system, predicted data using the combined weight.

2. The method of claim 1, wherein receiving the value corresponding to the adjustable control element comprises receiving the value corresponding to a user-moveable control icon in a graphical user interface.

3. The method of claim 1, wherein the computing further comprises:
aggregating the combined weight with data points in the seasonal data to produce the predicted data.

4. The method of claim 1, wherein calculating the first weight is based on a product of a value derived from the received value and a first weight coefficient for a respective data point in the seasonal data, wherein the first weight coefficient is determined by recursively partitioning the seasonal data according to peaks and using a recursion depth to estimate an importance of a corresponding peak in the seasonal data.

5. The method of claim 4, wherein calculating the second weight is based on a product of a value derived from the received value and a second weight coefficient for a respective data point in the seasonal data, the second weight coefficient decreasing with increasing time distance from a time point at which data prediction is to be performed.

6. The method of claim 1, further comprising visualizing a time series in the seasonal data using a cell-based visualization that includes cells representing respective data points in the seasonal data and respective predicted data points in the predicted data, wherein the cells are assigned respective colors according to attribute values of the corresponding data points.

7. The method of claim 1, further comprising:
displaying a representation of predicted data points in the predicted data; and
displaying a certainty band associated with the predicted data points for indicating degrees of certainty associated with the corresponding predicted data points.

8. The method of claim 7, wherein the certainty band uses different shading to highlight corresponding ones of the predicted data points that are associated with a more pronounced peak.

9. The method of claim 1, wherein a first adjustment of the adjustable control element causes the first weight to increase and the second weight to decrease, and wherein a second, different adjustment of the adjustable control element causes the first weight to decrease and the second weight to increase.

10. An article comprising at least one non-transitory machine-readable storage medium storing instructions that upon execution cause a system to:
receive seasonal data that exhibits a repeating pattern over time;
receive an indication relating to adjustment of an adjustable control element;
assign weights based on the indication, wherein the weights include a first weight for peak preservation of peaks in the seasonal data, and a second weight for time distance biasing in which more recent data points in the seasonal data are weighted higher than less recent data points, wherein assigning the weights comprises
calculating, based on a value derived from the received indication, the first weight for the peak preservation of peaks and the second weight for the time distance biasing;
combine the first weight and the second weight to produce a combined weight; and
compute predicted data using the combined weight.

11. The article of claim 10, wherein the adjustment control element includes a weighting slider.

12. The article of claim 10, wherein the instructions upon execution cause the system to further:
present a cell-based visualization of the seasonal data; and
receive, based on the cell-based visualization, a selection of a pattern for which the computing of the predicted data is to be performed.

13. The article of claim 12, wherein the cell-based visualization includes cells representing respective data points of the seasonal data, the cells assigned colors corresponding to a coloring attribute of the data points.

14. The article of claim 10, wherein the instructions upon execution cause the system to further:
present a line graph representing the seasonal data and the predicted data.

15. The article of claim 14, wherein the instructions upon execution cause the system to further:
present a certainty band around a portion of the line graph representing the predicted data, where the certainty band indicates degrees of certainty associated with the corresponding predicted data points in the predicted data.

16. The article of claim 10, wherein the instructions upon execution cause the system to further:
aggregate the combined weight with data points in the seasonal data to produce the predicted data.

17. The article of claim 10, wherein a first adjustment of the adjustable control element causes the first weight to increase and the second weight to decrease, and wherein a second, different adjustment of the adjustable control element causes the first weight to decrease and the second weight to increase.

18. The article of claim 10, wherein calculating the first weight is based on the product of a value derived from the received indication and a weight coefficient for a respective data point in the seasonal data, wherein the weight coefficient is determined by recursively partitioning the seasonal data according to peaks and using a recursion depth to estimate an importance of a corresponding peak in the seasonal data.

19. A system comprising:
at least one processor to:
receive seasonal data that exhibits a repeating pattern over time;
receive a value corresponding to an adjustable control element;
calculate, according to the received value, a first weight for preservation of peaks in the seasonal data and a second weight for time distance biasing in which more recent data points in the seasonal data are weighted higher than less recent data points, wherein applying the preservation of peaks avoids or reduces removal of peaks in the seasonal data;
combine the first and second weights to produce a combined weight; and
compute predicted data using the combined weight.

20. The system of claim 19, wherein the computing is further based on:
aggregating the combined weight with data points in the seasonal data to produce the predicted data.

21. The system of claim 19, wherein a first adjustment of the adjustable control element causes the first weight to increase and the second weight to decrease, and wherein a second, different adjustment of the adjustable control element causes the first weight to decrease and the second weight to increase.

22. The system of claim 19, wherein calculating the first weight is based on a product of a value derived from the received value and a weight coefficient for a respective data point in the seasonal data, wherein the weight coefficient is determined by recursively partitioning the seasonal data according to peaks and using a recursion depth to estimate an importance of a corresponding peak in the seasonal data.

* * * * *